United States Patent [19]
Hartmann

[11] Patent Number: 5,976,212
[45] Date of Patent: *Nov. 2, 1999

[54] METHOD AND PACKAGING UTILIZING CALCIUM CYANAMIDE FOR SOIL TREATMENT

[75] Inventor: Richard O. W. Hartmann, 1827 SW. Beaverton Hwy., Portland, Oreg. 97201

[73] Assignee: Richard O. W. Hartmann, Portland, Oreg.

[*] Notice: This patent is subject to a terminal disclaimer.

[21] Appl. No.: 08/954,231

[22] Filed: Oct. 20, 1997

[51] Int. Cl.$^6$ ....................................................... C05C 7/00
[52] U.S. Cl. ................................... 71/55; 71/28; 423/368
[58] Field of Search ................................... 71/28, 55, 63; 423/368

[56] References Cited

U.S. PATENT DOCUMENTS

| | | | |
|---|---|---|---|
| 1,185,731 | 6/1916 | Stutzer | 71/55 |
| 1,559,516 | 10/1925 | Breslauer et al. | 71/28 |
| 1,614,698 | 1/1927 | Stillesen | 71/28 |
| 2,157,541 | 5/1939 | Hosokawa | 71/28 |
| 2,964,395 | 12/1960 | Frank | 71/28 |
| 4,002,324 | 1/1977 | Huet . | |
| 4,214,888 | 7/1980 | Young | 71/28 |
| 4,443,242 | 4/1984 | Fox | 71/28 |
| 4,812,045 | 3/1989 | Rivers . | |
| 4,820,053 | 4/1989 | Rivers . | |
| 5,212,904 | 5/1993 | Green et al. . | |
| 5,335,449 | 8/1994 | Beatty . | |
| 5,698,004 | 12/1997 | Hartmann | 71/55 |

OTHER PUBLICATIONS

Cornforth, "Calcium Cyanamide in Agriculture," *Soils and Fertilizers*, 34:463–470 (1971).

Bryant et al., "Effects of Nitrogenous Fertiliser on the Chemical Composition of Short–Rotation Ryegrass and its Subsequent Digestion by Sheep," *N.Z. J. agric Res.*, 8:109–117 (1964).

Dilz et al., "nitrogen fertilization of grassland," *The Hague*, 7:66–71 (1963).

Hamissa et al., "The Fertilizing Values of Some Chemical Nitrogenous Fertilizers," *J. Soil Sci. U.A.R.*, 2:141–158 (1962).

Wells et al., "The Effects of Phosphorus and Organic Matter on the Concentration of Certain Decomposition Products of Cyanamid in Tobacco Plantbeds," *Soil Science Society Proceedings*, 192–196 (1957).

(List continued on next page.)

*Primary Examiner*—Wayne Langel
*Attorney, Agent, or Firm*—Klarquist Sparkman Campbell Leigh & Whinston, LLP

[57] ABSTRACT

Processes and structures for using calcium cyanamide fertilizer in a manner to greatly enhance its most effective soil treatment form prior to its application. Calcium cyanamide transformation structures have both fertilizing and pesticidal qualities; however, it is difficult to obtain uniform, efficient effectiveness from dry calcium cyanamide's liquid transformation structures. In the process of this invention, dry, dusty granules and fines of calcium cyanamide are placed directly into tanks of liquid for transformation or within biodegradable bags through which water can freely flow. The bags are submerged in a tank of water. The insoluble calcium and carbon components thereof remain as solid residuals within the bags. Hydrolysis occurs and the solution is biocidal and ready for immediate application. The solution can be sprayed or irrigated onto a targeted soil area with conventional dispersal equipment. The remaining non-dissolved material in the bags can be dispersed on and into the plant crop soil. Additives of other fertilizers into the above solution can be used to enhance effectiveness. When the calcium cyanamide is placed directly into the liquid, the mixture will become slurry-like. In the processes herein, when the solids of calcium cyanamide are not isolated during hydrolysis, the slurry mixture is utilized in recent modern specialized solids fertilizer suspension dispersed equipment having sufficient agitation to keep the solids in suspension.

24 Claims, 2 Drawing Sheets

OTHER PUBLICATIONS

Bjälfve, "The Nitrification of Calcium Cyanamide and Its Effects on the Soil Microflora," *Kungl. Lantbrukshögskolans Annaler.* 23:423–456 (1957).

Andrews, "The Use of Cyanamid as the Source of Nitrogen," *The Response of Crops and Soils to Fertilizers and Manures,* Second Edition, 76–83 (1954).

Cook et al., "The Effect of Cyanamid and Potash When Plowed Under With Organic Refuse on the Yield of Corn and Succeeding Corps," *Journal of the American Society of Agronomy,* 283–292 (1940).

Weidemann, "Fertilizer Placement Studies on Hillsdale Sandy Loam Soil," *Journal of the American Society of Agronomy,* 747–767 (1943).

Conrad et al., "Retention by Soils of the Nitrogen of Urea and Some Related Phenomena," *Journal of the American Society of Agronomy,* 48–54 (1939).

Smith et al., "Comparative Value of Cyanamid in Fertilization of Apple Trees: Soil Changes and Tree Response," Bulletin 273, 5–52 (1938).

Andrews, "The Response of Soybeans to Sources of Nitrogen in the Field," *Journal of the American Society of Agronomy,* 779–786 (1938).

Brown, "Some Chemical and Biological Effects of Cyanamid and Certain other Nitrogenous Fertilizers on Various Iowa Soils," *Journal of the American Society of Agronomy,* 442–450 (1933).

Moyer, "Calcium Cyanamid as a Nitrogenous Fertilizer," *New Jersey Agricultural Experiment Station,* 305–331 (1933).

Fink et al., "Three Years Results with an Intensively Managed Pasture," *Journal of the American Society of Agronomy,* 441–453 (1932).

Bartholomew, "Effect on Soil Reaction of Nitrogenous Fertilizers Under the Anaerobic Conditions of Rice Production," *Journal of the American Society of Agronomy,* 1305–1313 (1928).

Helz et al., "Effects of Fertilizer Treatment on the Formation of Nodules on the Soybean," *Journal of the American Society of Agronomy,* 975–981 (1928).

Merkle, "The Decomposition of Organic Matter in Soils," *Journal of the American Society of Agronomy,* 10:281–302 (Oct./Nov. 1918).

Jensen, "Solubility of Plant–Food Elements as Modified by Fertilizers," *Journal of the American Society of Agronomy,* 100–105 (1915).

Jensen, "Nitrification and Total Nitrogen as Affected by Crops, Fertilizers, and Copper Sulfate," *Journal of the American Society of Agronomy,* 10–22 (1915).

Watson, "Control of Root–Knot by Calcium Cyanamide and Other Means," *Florida Agricultural Experiment Station,* Bulletin 136, 145–160 (Apr. 1917).

Hurst et al., "Calcium Cyanamide and other Atrificial Fertilisers in the Treatment of Soil infected with *Heterodera schachtii,*" *Journal of Helminthology,* 13:201–218 (Dec. 1935).

Newton et al., "The Treatment of Glasshouse Soils with Chloropicrin for the Control of *Heterodera Marioni* (Cornu) Goodey, and other Soil Pathogens," *Canadian Journal of Research,* 15:182–186 (1937).

Hurst et al., "Further Experiments on the Chemical Treatment of Soil infected with *Heterodera schachtii,*" *Journal of Helminthology,* 15:1–8 (Jan. 1937).

Edwards, "Field Experiments on Control of the 'Potato–Sickness' associated with the Nematode, *Heterodera schachtii,*" *Journal of Helmintology,* 15:77–96 (Apr. 1937).

Hurst et al., "Field Experiments in Lincolnshire on the Chemical Treatment of Soil infected with *Heterodera schachtii,*" *Journal of Helminthology,* 15:9–20 (Jan. 1937).

Hurst et al., "A Second Series of Field Experiments in Lincolnshire on the Chemical Treatment of Soil infected with *Heterodera schachtii,*" *Journal of Helminthology,* 16:1–4 (Feb. 1938).

Hurst, "On the Relative Distribution of Cysts of *Heterodera schachtii* and a Chemical Dressing incorporated with Infected Land by means of a Rototiller," *Journal of Helminthology,* 16:57–60 (Feb. 1938).

Hurst et al., "Field Experiments in Bedfordshire on the Chemical Treatment of Soil infected with the Potato Eelworm *Heterodera schachtii,* during 1936–37," *Journal of Helminthology,* 16:33–46 (Feb. 1938).

Hurst, "Pot Experiments on the Chemical Treatment of Soils Infected with the Potato and Oat Strains of *Heterodera schachtii,*" *Journal of Helminthology,* 16:61–66 (May 1938).

Young, "Tomato Wilt Resistance and its Decrease by *Heterodera Marioni,*" *Phytopathology,* 29:871–879 (1939).

Burgis et al., "Herbicides for Control of Weeds in Vegetable Seedbeds Also Control Root–Knot," *Proceedings of the American Society for Horticultural Science,* 52:461–463 (1948).

McMurtrey, Jr., "Growing Better Tobacco," *Economic Botany,* 2:326–332 (1948).

Graham, "Weed and Root Knot Control in Tobacco Plant Beds by Surface Drench and other Treatments," *Plant Disease Reporter,* 40:1041–1044 (Dec. 1956).

Peacock, "The Effect of Chemical Treatments on Root–Knot Nematodes in the Gold Coast," *Empire Journal of Experimental Agricultural,* 25:99–107 (1957).

Mojtahedi et al., "The Effects of Ammonia–Generating Fertilizer on Criconemoides xenoplax in Pot Cultures," *Journal of Nematology,* 8:306–309 (Oct. 1976).

Yoshinaga et al., "Potentiometric Determination of Cyanoguanidine and Analysis of Its Unique Titration Curve," *Journal of AOAC International,* 78:1339–1345 (1995).

Pulci et al., "An In Vivo/In Vitro Study of Allyl Alcohol Toxicity Using Enzyme Inhibitors," *Alternative to Laboratory Animals,* 21:38–42 (Jan. 1993).

Suzuki et al., "Analysis of the Rotting Process of Rice Straw–Calcium Cyanamide Mixture by Physical Fractionation," *Soil Sci. Plant Nutr.,* 21:173–183 (1975).

Brown et al., "The Product of Artificial Manure from Oats Straw Under Control Conditions," *Journal of the American Society of Agronomy,* 310–322 (1928).

Chamberlain et al., "Control of Stable Flies (Diptera: Muscidae) with a Unique Nitrogen Fertilizer, Calcium Cyanamide," *J. Econ. Entomol,* 79:1573–1576 (1986).

Ross et al., "Preliminary Investigations of the Use of Calcium Cyanamide as a Molluscicide to Control Fascioliasis in Northern Ireland," *The Veterinary Record,* 87:373–375 (1970).

Marlatt et al., "Fungicidal Control of Big Vein in the Irrigated Lettuce Crop," *Phytopathology,* 53:597–599 (1963).

Rodaway, "Substituted nitroguanidines provide cytokinin activity during in vitro cultivation of plant tissues," *Plant Cell Reports,* 12:273–277 (1993).

Singh et al., "Arabidopsis Acetohydroxyacid Synthase Expressed in *Escherichia coli* Is Insensitive to the Feedback Inhibitors," *Plant Physiol.*, 99:812–816 (1992).

Wünsch et al., "Formation of Arginine from Ornithine and Cyanamide in Bush Beans (*Phaseolus Vulgaris*) and Rape (*Brassica Napus*)," *Journal of Plant Nutrition*, 12:1–7 (1989).

Erez, "Defoliation of Deciduous Fruit Trees with Magnesium Chlorate and Cyanamide," *HortScience*, 20:452–453 (1985).

Iwasaki, "Effects of Bud Scale Removal, Calcium Cyanamide, $GA_3$, and Ethephon on Bud Break of 'Muscat of Alexandria' Grape (*Vitis uinifera* L.)," *J. Japan. Soc. Hort. Sci.*, 48:395–398 (1980).

Imamaliev et al., "Influence of Defoliants on Carbohydrate and Nitrogen Metabolism in Cotton Leaves," *Fiziologiya Rastenii*, 15:74–83 (1968).

Prokofev, "Use of Defoliants for Increasing the Rate of flow of Assimilates into Seeds," *Fiziologiya Rastenii*, 12:416–423 (1965).

Burkett et al., "Effects of Age of Plant and Retting Procedures on Kenaf, *Hibiscus cannabinus* L., Fiber," *Agronomy Journal*, 255–260 (1948).

Wong et al., "Development of an Enzyme–Linked Immunosorbent Assay for Imazaquin Herbicide," *J. Agric. Food Chem.*, 40:811–816 (1992).

Brown et al., "Pendimethalin/prometryn, a new conformulation for weed control in peas and beans," *Aspects of Applied Biology*, 393–396 (1991).

Mustafee, "Weed problems in wheat and their control in the Indian subcontinent," *Tropical Pest Management*, 37:245–251 (1991).

Skoog, "Chemical Control of Weeds in Burley Tobacco Plant Beds," *The University of Tennessee Agricultural Experiment Station*, Bulletin 346:1–23 (Jul. 1962).

McCants et al., "Urea and Calcium Cyanamide in Tobacco Plant Beds," *North Carolina Agricultural Experiment Station*, Tech. Bul. 105:3–31 (May 1954).

Volk, "Factors Determining Efficiency of Cyanamid and Uramon for Weed Control in Tobacco Plantbeds," *Florida Agricultural Experiment Station*, 377–390 (1949).

Sturkie, "Control of Weeds in Lawns with Calcium Cyanamide," *Journal of the American Society of Agronomy*, 29:803–808 (Oct. 1937).

Pipitone et al., "Cropping of Plums and Prunes in Relation to Nitrogen Fertilisation," *Acta Horticulturae*, 359:195–198 (May 1994).

Ta et al., "Nitrogen Partitioning in Maize during Ear Development," *Crop Sci.*, 32:443–451 (1992).

Nianzu et al., "Effect of lime nitrogen on the efficiency of urea and other ammonium nitrogen fertilizers," *Fertilizer Research*, 41:19–26 (1995).

Ta, "Nitrogen Metabolism in the Stalk Tissue of Maize," *Plant Physiol*, 97:1375–1380 (1991).

Arora et al., "Effectiveness of Calcium Cyanamide as a Nitrogen Source and Nitrification Inhibitor in a Tropical Soil," *Soil Sci. Soc. Am. J.*, 51:1653–1656 (1987).

Pleysier et al., "Nitrogen leaching and uptake from calcium cyanamide in comparison to urea and calcium ammonium nitrate in an ultisol from the humid tropics," *Fertilizer Research*, 12:193–199 (1987).

Arora et al., "Transformation of calcium cyanamide and its inhibitory effect on urea nitrification in some tropical soils," *Fertilizer Research*, 12:3–9 (1987).

Fink, "Soil Factors Which Prevent Toxicity of Calcium Cyanamide," *Journal of the American Society of Agronomy*, 929–939 (1934).

Bissey et al., "Experiments on the Control of Mustard," *Journal of the American Society of Agronomy*, 124–135 (1929).

Auchmoody et al., "Effect of Calcium Cyanamide on Growth and Nutrition of Planted Yellow–Poplar Seedlings," *Northeastern Forest Experiment Station*, 265:1–11 (1973).

Smith et al., "Comparative Value of Cyanamid in Fertilization of Apple Trees: Soil Changes and Tree Response," *Agricultural Experiment Station*, Bulletin 273, 1–51 (1938).

Allison, "Cyanamid, Its Uses as a Fertilizer Material," *United States Dept. of Agriculture*, 1–12 (1929).

"Bibliography on Calcium Cyanamide as Fertilizer," *Commonwealth Bureau of Soils*, Serial No. 1411, 1–20 (1970).

Tisdale et al., *Soil Fertility and Fertilizers*, First Edition (1956).

Tisdale et al., *Soil Fertility and Fertilizers*, Third Edition (1975).

Kuhn et al., "Insecticidal Pyrroles," *Pest Control with Enhanced Environmental Safety*, 219–232 (1993).

MacHardy, "Apple Scab Biology, Epidemiology, and Management," *The American Phytopathological Society*, 444–453 (1996).

Burrows, *Textbook of Microbiology*, Twentieth Edition, v–xvii (1973).

Mullen et al., "Pre–emergence weed control in processing tomatoes," *Western Society of Weed Science. Research Progress Report*, II–12–II–13 (1992).

"Wyoming Sugar Beet Research," *University of Wyoming. Agricultural Experiment Station*, Research Journal 120 (Jan. 1978).

Matheny, "Treating Soil with Urea and Calcium Cyanamide for the Control of Root–Knot Nematode, Weed Seeds and Fungi," *Virginia Department of Agriculture and Immigration*, (Feb. 1953).

Forster et al., "Root–Knot Nematode," *Florida. Agricultural Experiment Station*, 143 (1947).

King, Abstract of "Comparative Injury of Root–knot Nematodes to Different Varieties and Species of Cotton in Control Experiments Under Irrigation," *Phytopathology*, 28:664 (1938).

Young, Abstract of "Chemical Soil Treatment to Control *Fusarium lycopersici*, *Heterodera marioni*, and Weeds," *Photopathology*, 29:25 (1939).

Bradley, "Genetic weeding and feeding for tobacco plants," *New Scientist*, 11 (Jan. 1992).

English Summary of: Rotini et al., "Transformation of calcium cyanamide in waterlogged soils," *Agrochimica*, 15:523–530 (Oct. 1971). (Summary on p. 529).

English Summary of: Reichard et al., "Preliminary report of attempts to inhibit lodging of cereals," *Bodenkutur*, 12:29–40 (1961). (Summary on p. 39).

English Summary of: Rotini et al., "The effect of soil moisture on the transformation of calcium cyanamide," *Agrochimica*, 4:354–361 (1960). (Summary on p. 361).

English Summary of: Amberger et al., "The effect of combing 'straw–green manurting' with calcium cyanamide in long–term field experiments," *Z. Acker– u Pflanzenbau*, 134:323–334 (Dec. 1971). (Summary on p. 333).

English Summary of: Rinno, "Causes of sewage sickness of soils," *Albrecht–Thaer–Archiv*, 8:699–710 (1964). (Summary on pp. 709–710).

English Summary of: Wünsch et al., "The occurance of arginine in the metabolism of plants fed with cyanamide," *Zeitschrift fuer Pflanzenphysiologie,* 72:359–366 (May 1974). (Summary on p. 359).

English Summary of: Stransky et al., "Isolation and properties of a cyanamid hydratase [E.C. group 4. 2. 1.] from *Myrothcium verrucaria* Alb. and Schw," *Zeitschrift fuer Pflanzenphysiologie,* 70:74–87 (1973). (Summary on p. 74).

English Summary of: Buhl, "Twin and triplet ears on winter rye as result of excessive application of calcium cyanamide fertilizers," *Zeitschrift fuer Pflanzenkrankheit, Pflanzenpathologie und Pflanzenschutzdienst,* 76:92–94 (Feb. 1969). (Summary on p. 93).

English Summary of: Marlow, "Result of mechanical and chemical control of weeds in the cultivation of bush beans over several years," *Archiv Gertenbau,* 12:161–182 (1964). (Summary on p. 181).

English Summary of: Skoog, "Chemical control of weeds in burley tobacco plant beds," *Tennessee Agricultural Experiment Station,* 346:32–36 (1962). (Summary on p. 36).

English Summary of: Silva et al., "Comparative efficiency of new nitrogen fertilizers and calcium cyanamide in lowland rice," *Riso. Milano, Ente nazionale risi,* 29:203–215 (Sep. 1980). (Summary on pp. 214–215).

English Summary of: Amberger et al., "Breakdown of calcium cyanamide in quartz sand and in difference soils," *Journal of Agronomy & Crop Science,* 148:1–12 (Feb. 1979). (Summary on p. 12).

English Summary of: Amberger et al., "The effect of cyanamide, dicyanamide, guanylurea, guanidine and nitrite on the activity of urease soils," *Landwirtschaftsliche Forschung,* 32:409–415 (1979). (Summary on pp. 413–414).

Kawana et al., "Studies on fertilization in established stands v. comparison with urea–P–K and calcium cyanamide–P–K compound fertilizer in Hinoki [*Chamaecyparis obtusa*] stand," *Tokyo–Univ–Agric–Text–Ind–Fac–Agric–Bull–Exp–Forests,* 9:1–10 (May 1971).

English Summary of: Rotini et al., "The uptake of cyanamide in the presence of ammonium and nitrate ions [wheat]," *Agrochimica,* 16:480–486 (Oct. 1972). (Summary on p. 486).

English Summary of: Carloni et al., "Effect of calcium cyanamide on the structure index of the soil," *Agrochimica,* 19:388–393 (Sep. 1975). (Summary on p. 392).

English Summary of: Dannenhauer et al., "Experiments with Alzodef (cyanamide) for soil disinfection in vegetable and ornamental crops," *Journal of Plant Diseases and Protection,* 90:468–478 (1983). (Summary on pp. 468–469).

English Summary of: Verona et al., "Effect of cyanamide on benomyl–sensitive and benomyl–tolerant strains of *Botrytis cinerea* and *Verticillium dehliae,*" *Journal of Plant Diseases and Protection,* 87:756–758 (1980). (Summary on p. 756).

English Summary of: "Studies on the application of calcium cyanamide in Taiwan. #3: Experimental results with rice on latosol saline soil, the Kan Tien Tiuen soil (a planosol–like soil) and slate alluvial soil," *Agricultural Research,* 11:38–44 (Mar. 1962). (Summary on p. 44).

English Summary of: Prietzel, "Reactions of cyanamide with starch," *Starke,* 22:424–426 (Dec. 1970). (Summary on p. 424).

English Summary of: Vilsmeier et al., "Inorganic catalytical breakdown of cyanamide and its metabolites in quartz sand II. Cyanamide breakdown as influenced by metal oxides and temperature," *Z. Pflanzenernaehr,* 141:677–685 (1978). (Summary on p. 685).

English Summary of: Fehrmann et al., "Influence of cyanamide and calciumcyanamide on sporulation of *Cercosporella herpotrichoides* Fron," *Zeitschrift für Pflanzenkrankheiten und Pflanzenschutz,* LXXVIII, 321–328 (1971). (Summary on pp. 327–328).

English Summary of: De Groote, "The effect of calciumcyanamide on free living plant parasitic nematodes," *Mededeelingen van de Landbouwgeschool en de Opzoekingsstations van de Staat te Gent.,* 1097–1105 (1960). (Summary on p. 1105).

English Summary of: Moens et al., "Control of Slugs (*Agriolimax reticulatus* Müller)," *Mededeelingen van de Landbouwgeschool en de Opzoekingsstations van de Staat te Gent.,* 21:401–410. (Summary on p. 410).

English Summary of: Hugenroth et al., "Use of cyanamide for reducing the odor of liquid manures and other liquid wastes," *Landwirtschaftliche Forschung,* 26:374–377 (1973). (Summary on p. 377).

English Summary of: Huang et al., "Effects of S–H Mixture or Perlka on Carpogenic Germination and Survival of Sclerotia of *Sclerotinia Sclerotiorum,*" *Soil. Biol. Biochem,* 23:809–813 (1991). (Summary on p. 809).

English Summary of: Chamura et al., "Tolerance of Crops to Soil Acidity (II) Relation between the pH value of soil and the growth of some crop plants with special reference to the response to calcium cyanamide," *Nippon Shaumots,* 32:225–228 (1964). (Summary on p. 228).

English Summary of: Heitefuss et al., "Side–effect of Herbicides and Calcium Cyanamide on the Infection of Wheat with *Erisphe Graminis,*" *Nachrichtenblatt fuer den Deutschen Pflanzenschutsdienst,* 22:40–43 (Mar. 1970). (Summary on p. 43).

English Summary of: Vilsmeier et al., "Transformation of Cyanamide, Urea and Ammonium Sulfate as Influenced by Temperature and Moisture of Soil," *Z. Pflanzenernaehr. Bodenkd.,* 143:47–54 (1980). (Summary on p. 47).

English Summary of: Ernst, "The Breakdown of Cyanamide in Arable Soils," *Aus dem Institut für Strahlenbiologie der TH Hannover,* 34–44 (1967). (Summary on p. 44).

Wolf et al., "Pre–emergence Control of Weeds in Corn with Calcium Cyanamide," *Journal of the American Society of Agronomy,* 568–570 (1947).

Schott et al., "Improvement of tillering and plant height of *Saccharum officinarum* L. with the bio–regulator hydrogen cyanamide," *International Conference on the technical use of Dormex,* 1–19 (1989).

English Summary of: Amberger et al., "Inorganic catalytical transformation of cyanamide and its metabolites in quartz sand I. Mechanism of cyanamide breakdown as influenced by iron oxides an moisture," *Z. Pflanzenernaehr. Bodenkd.,* 141:665–676 (1978). (Summary on p. 676).

English Summary of: Radaelli et al., "Studies on the hydrolysis of urea cyanamide. 3: Catalytic activity of mineral soils," *Agrochimica,* 13:103–110 (Dec. 1968–Feb. 1969). (Summary on p. 110).

Sturkie, "Control of Weeds in Lawns with Calcium Cyanamide," *Journal of the American Society of Agronomy,* 29:803–808 (Oct. 1937).

English Summary of: Van den Brande et al., "Chemische bestrijding van het aardappelcystenaaitje *Heterodera rostchiensis,*" *Mededeelingen van de Landbouwgeschool en de Opzoekingsstations van de Staat te Gent.,* 16:247–259. (Summary on p. 257).

English Summary of: Kunz "Über die innertherapeutische insektizide Wirkung des Cyanamids," *Zeitschrift für Pflanzenkrankheiten (Pflanzenpathologie) und Pflanzenschutz,* 61:481–521 (1954). (Summary on p. 519).

English Summary of: Arenz et al., "Über die Auswirkung einer Cyanamidernährung von Kartoffelpflanzen auf den Besatz mit Kartoffelkäferlarven," *Zeitschrift für Pflanzenkrankheiten (Pflanzenpathologie) und Pflanzenschutz,* 59:334–339 (1953). (Summary on p. 339).

English Summary of: Fischbeck et al., "Einfluβ einer Kalkstickstoffdüngung bzw. einer Spritzung mit wässeriger Cyanamid–Lösung auf den Belfall des Getreides mit Mehltau (*Erysiphe graminis*)," *Zeitschrift für Pflanzenkrankheiten (Pflanzenpathologie) und Pflanzenschutz,* 71:24–34 (1964). (Summary on p. 33).

English Summary of: "Neue Gesichtspunkte für die Anwendung von Kalkstickstoff im Kartoffelbau," *Der Kartoffelbau,* 4/5:78–79 (1953). (Summary on p. 79).

English Summary of: Bachthaler et al., "Bekämpfung von Unkräutern, Schadgräsern und Halmbruchkrankheit (*Cercosporella herpotrichoides* Fron) in Winterweizen durch kombinierte Anwendung von Kalkstickstoff und Bodenherbiziden," *Zeitschrift für Pflanzenkrankheiten (Pflanzenpathologie) und Pflanzenschutz,* 237–243 (1970). (Summary on p. 241).

English Summary of: Heitefuβ et al., "Der Einfluβ von Herbiziden und Kalkstickstoff auf den durch *Cerosporella herpotrichoides* Fron. Verursachten Halmbruch des Weizens," *Zeitschrift für Pflanzenkrankheiten (Pflanzenpathologie) und Pflanzenschutz,* 641–659 (1968). (Summary on p. 658).

English Summary of: Arenz et al., "Über die Auswirkung einer Cyanamidernährung von Karoffelpflanzen auf den Besatz mit Karoffelkäferlarven," 334–339 (1954). (Summary on p. 339).

English Summary of: Pätzold, "Ergenbisse mehrjähriger Unkrautbekämpfungsversuche in Kartoffeln," 63–66. (Summary on p. 66).

English Summary of: Van den Brande et al., "The nematicidal activity of Calcium Cyanamide" 17. (Summary on p. 17).

Thompson, "Use of Cyanamide in Seed Beds," *Trelawney Tobacco Research Station,* p. 76 of 76–92 (1948).

Jacobson, *Encyclopedia of Chemical Reactions,* vol. II, p. 45, Reinhold Publishing Company, 1948.

METHOD AND PACKAGING UTILIZING CALCIUM CYANAMIDE FOR SOIL TREATMENT

BACKGROUND OF THE INVENTION

The use of calcium cyanamide as a pre-plant/emergence treatment of soil dates back approximately one hundred years. For the most part, it has been topically applied as an insoluble, dry nitrogen fertilizer having some pesticidal qualities dependent on latent or applied moisture conditions. There are prior art publications recommending high rates of application, 200 pounds to 2000+ pounds per acre, to reduce crop competitive plants, weed seeds, soil animals and microorganisms. Calcium cyanamide has long been recognized as a nitrogen fertilizer having both fertilizing and pest control effects. At those rates its pest control uses have, for economic and practical reasons, disappeared in the United States in favor of select pesticides.

Contrary to calcium cyanamide, many of today's commonly used nitrogen fertilizers are immediately water soluble and they or their normal metabolites are directly plant leaf and root absorbable. These nitrogen fertilizers, or their metabolites, have been shown to create areas detrimental to plants, seeds, animals and microorganisms that are competitive to commercial crops. Also, certain caustic fertilizers described hereinafter do likewise. These products alone, however, have not been satisfactorily perfected as plant protectants.

Recommendations for applying calcium cyanamide fertilizer at levels below 200 pounds per acre have not heretofore been recommended. As an example of the effectiveness of the processes taught herein, the prior art teaches a 41% nematode reduction using 427 pounds per acre of calcium cyanamide in "ideal wet" soil versus an 86% reduction resulted using only 20 pounds per acre when the processes described herein are followed.

For various reasons, the use of calcium cyanamide as a dry nitrogen fertilizer treatment has dropped dramatically in United States agriculture in favor of soluble nitrogen fertilizers. These reasons include calcium cyanamide's comparative high energy dependent unit cost. A second reason is its historically high-rate biocidal cost compared to recently developed pesticides. Thirdly, its dry, dusty noxious fines makeup is undesirable for human handling and difficult to measure and calibrate alone or with other fertilizers for maximum effectiveness. A higher cost, lower analysis pelletized form improves, but does not eliminate, direct dry application handling problems. Fourth, several of calcium cyanamide soil beneficial components, namely calcium and carbon, will clog standard liquid spray applicators if one attempts to dissolve it in water for efficient dispersal.

FIELD OF THE INVENTION

One of the principal advantages of this invention is to eliminate the necessity of applying (dispersing) calcium cyanamide (CaNCN) on soil in the product's dry, dusty form. The methods herein described not only eliminate this necessity, but vastly improve the product's performance. The invention incorporates several methods for efficiently using calcium cyanamide for soil treatment by utilizing recently developed fertilizer equipment now used for the liquid suspension of other insoluble fertilizer applications with or without other fertilizers and/or pesticides.

Commonly available liquid spray or irrigation injection equipment could not be used heretofore because a mixture of calcium cyanamide in water clogs the equipment due to the insolubility of certain components of calcium cyanamide, namely calcium and carbon. To correct this, the invention utilizes filter quality shipping bags and other containers in tanks to capture the insoluble components.

Agricultural soils are a complex, physical, chemical, and biological biosphere. When man makes the soil rich with fertilizers for desirable plant growth, it likewise becomes more attractive to competitive unwanted weeds and other growths which can hinder desired crop production. Thus, a product with initial pesticidal qualities and later plant food qualities is very desirable, especially for pre-planting treatment and post-plant treatment.

An objective of this invention is to make calcium cyanamide's water-hydrolyzed cyanamide nitrogen reactant immediately fully active before and/or during soil diffusion application of the product and, thus, many times more commercially effective. This removes dependence on latent or time-lagged separate moisture treatment and soil incorporation.

Other objectives of this invention are to (i) use calcium cyanamide hydrolysis products alone, or in combinations with other plant beneficial materials in a manner to initially increase the detrimental effects against competitive growths to the desired crops, and (ii) prevent soil leaching loss and soil stabilizing of its own N metabolites and other latent soil N forms or those from other N fertilizers using the fully active, hydrolyzed cyanamide nitrogen form, hereinafter referred to as cyanamide N, also known to enhance its known trait of interim debilitating soil microorganisms which convert soil affixed N forms to environmentally, undesirable leachable nitrate N forms.

A still further objective, contrary to food crop residue pesticides, is to provide a non-residue fertilizer for pest control up through the pest critical harvest threshold. Another objective is to synergistically achieve the above effects with other fertilizers.

Because of the high liquid-to-insoluble fertilizer/pesticide ratio and the calcium cyanamide liquefaction processes of this invention, the negative handling characteristics of the dusty, noxious, diffuse factory fine particles are no longer air-polluting dusty or noxious. The fines are changed from an undesirable application trait, becoming more uniformly dissolvable, calibratable to an acceptable degree of accuracy, and dispersible by fertilizer suspension apparatuses or common liquid applications. This affords a quick equilibrium reaction to make soluble cyanamide N effective prior to and during application. It allows the use of soluble fertilizer additives for pH adjustment to sites. It allows synergism with simultaneously applied plant foods having similar plant food and pesticidal effects. It improves its known effect of preventing off site leaching of crop valuable and useable nitrogen plant foods which are undesirable to other animal and human habitats. The above effects broaden and increase the invention's effectiveness many fold and, therefore, reduce amounts formerly required to offset innate site variables of chemical soil traits and moisture. In the case of simultaneous irrigation injection, partial cyanamide N decomposition and the separate soil drying mechanical soil incorporation is eliminated. All of the above creates new economic life with agriculturally affordable dosages and human and environmentally desirable handling traits.

Summarizing, the following advantages and objectives are gained by utilizing the processes described herein:

1. Dust exposure of fines/granules to humans are essentially eliminated.

2. Application accuracy is improved by permitting a liquid application versus irregular fines/granules spreading.

3. Dusty, low-cost factory fines can be utilized and are actually preferred.

4. Sludge-clogging stoppages for liquid delivery are substantially reduced or eliminated.

5. A controlled hydrolysis equilibrium reaction is assured.

6. One can readily adjust liquid product to account for the alkalinity or acidity of the soil or soil water that is likely to be encountered.

7. Synergistic effects are achieved by the mutual utilization of the commonly known bio-active traits of CaNCN and the pH stabilizing effect of bio-active caustic nitrogen forms and other fertilizers when mixed and used in the described process. Such mutual bio-activity, when combined, synergistically lowers the separate rates at which each may affect the site.

8. The processes reduce losses to air that occurs when using dry applications.

9. Substantially lowers dosages, 10–20 fold (pounds per acre), are effective.

10. The processes make pinpoint site delivery possible of the neutralization effect of detrimental delayed acidification of the simultaneously applied common soluble nitrogen forms.

11. The processes reduce nitrate loss to ground water of calcium cyanamide and all simultaneous soluble nitrogen forms.

12. The processes aid in the goal of "Integrated Pest Management" (IPM) by affording a reduction of pesticide use, which is potentially harmful to the environment.

DESCRIPTION OF THE PREFERRED EMBODIMENTS

As stated above, the processes and methods described herein make it possible to apply calcium cyanamide as a pesticide/fertilizing agent, utilizing available dispersal equipment and containers. Additionally, the processes described herein use high ratios (14×+) of water to commercial product before application on the targeted soil. When calcium cyanamide is mixed with water at these ratios, a completed equilibrium hydrolysis transformation reaction is immediately created.

Figures 1, 2, 3, 4:
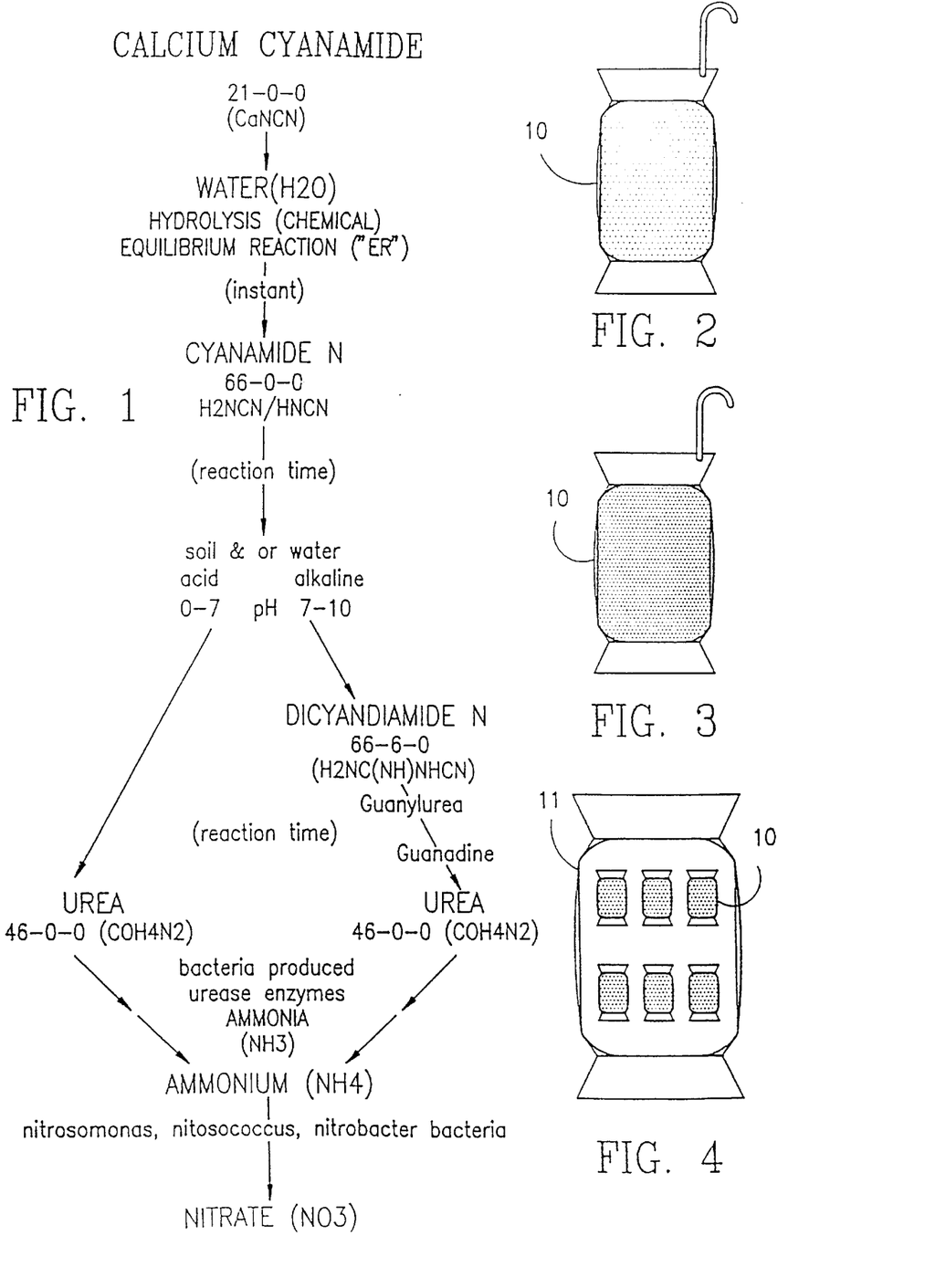
FIG. 1 is a diagrammatic/schematic view of a chain of chemical events.
FIG. 2 is a plan view of a filter bag.
FIG. 3 is the bag of FIG. 2 filled with calcium cyanamide.
FIG. 4 is a diagrammatic representation of a container housing plurality of the bags shown in FIG. 3.
Figures 5, 6, 7:
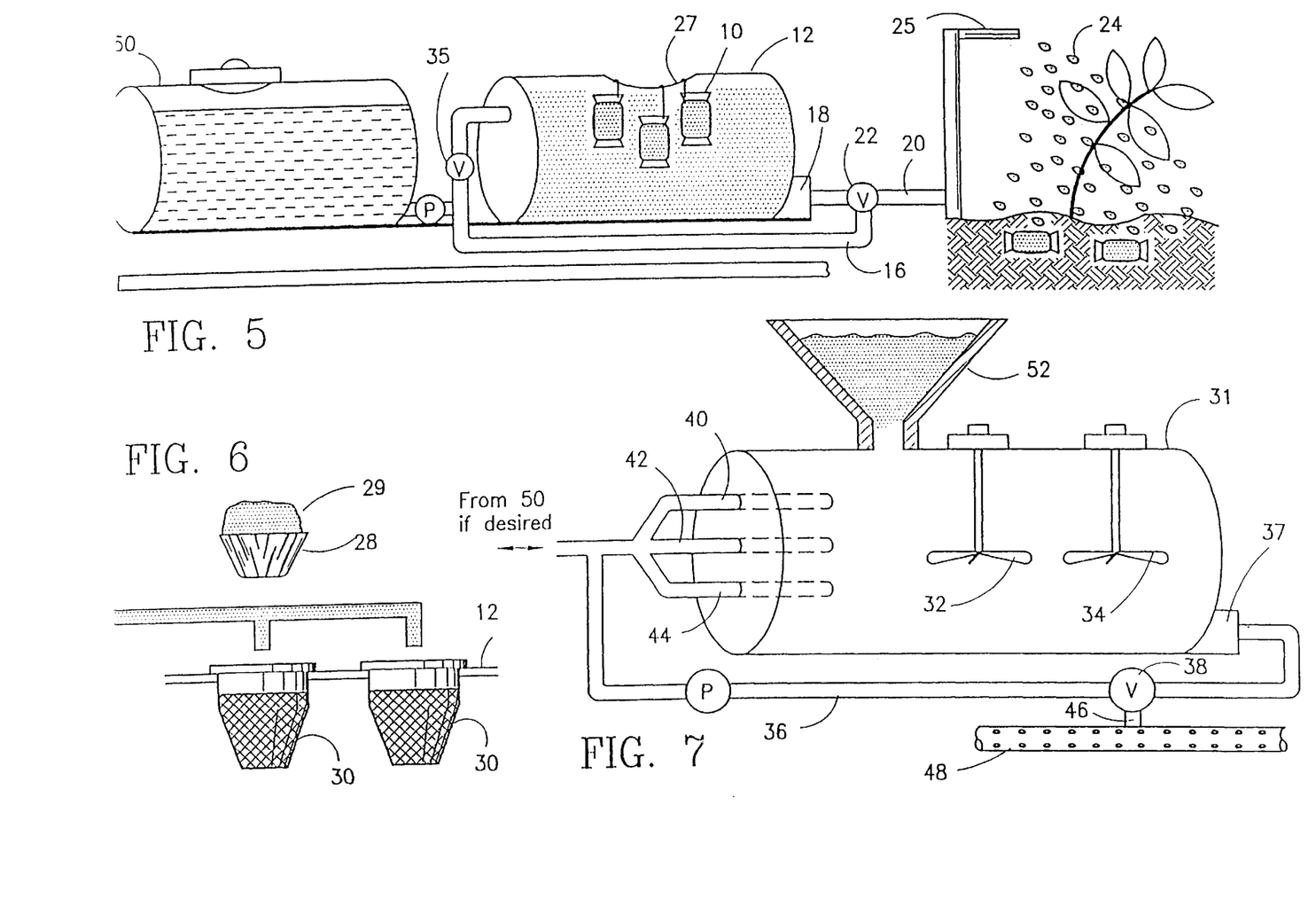
FIG. 5 is a diagrammatic view of a fertilizer system.
FIG. 6 is a diagrammatic view of a filter bag supported by a screened.
FIG. 7 is a diagrammatic view of a tank with agitator blades therein.

This invention permits the use of existing agricultural field application processes, namely solid suspension/fluid and/or hand and mechanical applications, dispensing into irrigation systems formation of the cyanamide N, before its value as a pesticide has dissipated. As will be seen hereinafter, the process of this invention regularizes the hydrolysis and maximizes the intensity and duration of the cyanamide N for immediate maximum biocidal action.

As seen in FIG. 1, if the soil and water are acidic—that is, having pH factor of 0 to 7, urea is rapidly formed from cyanamide N which will thereafter change to soil-affixing ammonia and leachable nitrate N forms. Urea, ammonium and nitrates are standardly recognized as beneficial to the plants as plant food, while urea and ammonia are also know to have biocidal effects. It is the initial full biocidal action of cyanamide N, however, that is sought without losing its—and its metabolites—beneficial fertilizer effects. If the calcium cyanamide is dispersed on a pH 7–10 alkaline soil, or if the water with which it is mixed is pH 7–10 alkaline and the soil acts as a filter of the contained calcium, the cyanamide N is quickly converted to dicyandiamide, which is not biocidal. As the chemical reaction continues, the product will convert to urea, ammonium and nitrate, as shown previously. As herein described, the pre-addition of a caustic fertilizer to assure a pH of 10–14 causes the anion of cyanamide N to stay and remain biocidal in alkaline soils until it goes to urea, etc.

In order to obtain the combined benefit of calcium cyanamide as a pesticide and a fertilizer, the formation and preservation of cyanamide N is essential. It is the cyanamide N that will act as the pesticide, and unless stabilized, it should be fully and completely dispersed on the targeted soil shortly after its formation. Although processes hereinafter described are for pre-planting application, experimentation currently underway proves these processes successful for both pre-planting and post-planting environments.

As stated previously, calcium cyanamide is dusty, noxious and difficult to handle. If mixed with water, spreading is not readily accomplished because of certain insoluble products which resist going into solution with the water. This will cause clogging in ordinary liquid dispersing machines.

Metabolization direction of the cyanamide N is affected by the acidity or alkalinity of the water and soil. In alkaline soils, cyanamide N between pH 7–10 quickly becomes dicyandiamide, which, although bio-static to N converting bacteria, cannot be termed biocidal. When alkaline soils are to be treated, therefore, the cyanamide N should be mixed in a solution to which caustic fertilizer has been added. This will overcome the soil filtering of the small amount of contained caustic calcium, thus maintaining a pH above 10 so that cyanamide N anion form remains bio-effective. It will then pass either to dicyandiamide or directly to urea, etc.

Thus, it can be seen that liquidization allows for accurately tailoring (calibrating) calcium cyanamide and cyanamide N with other fertilizers to prep for various soil and water conditions. After testing, additional soluble and/or liquid caustic or acid fertilizer can be added until the desired pH is obtained. Proper mixtures regularize the chemical reactions and stability. Liquidization also eliminates human exposure to noxious fines and permits one to accurately judge the amount of acidity or alkalinity to be added for maximum effectiveness.

FIG. 2 is a plan view of a biodegradable filter bag 10 which can be filled with calcium cyanamide. Water is permitted to flow there through, thus hydrolyzing it to soluble cyanamide N, capturing the carbon and calcium in the bag.

FIG. 3 is the bag shown in FIG. 2 filled with calcium cyanamide.

FIG. 4 is merely a diagrammatic representation of a large container 11 that can house a plurality of bags 10 shown in FIG. 3. Such a container can be hermetically sealed and used for purposes of transportation and storage.

As seen in FIG. 5, a plurality of bags 10 are suspended within a tank 12 containing water and/or liquid fertilizers. The bags 10 will act as tea bags through which the liquids can flow. In order to cause the flow, the assembly is equipped with a conduit 16 which extends from the lower part of one tank end to an upper level at the other end of the tank. Intermediate the length of the conduit 16 is a pump 18 which will cause a recirculation flow of the fluid in the tank so that water will pass through the bags 10 until the soluble cyanamide goes into solution. FIG. 5 also shows the bags 10 suspended in the tank via strings or handles. The insoluble, primarily calcium and carbon, will be retained in the bags 10. These bags are made of a porous material such as paper, cloth, or the like. The interstices in the material of bags 10 must be small enough to prevent the escape of the insoluble calcium and carbon, but large enough to permit water or a similar liquid to pass there through. The sealed shipping containers can be provided with tear strips or the like for easy removal of the bags and/or the contents thereof. After sufficient recirculation, a clear liquid is sent to exit line 20 upon activation of a valve 22. This clear liquid 24 can be used with, and will not clog, common conventional liquid spreaders or irrigation injectors. The solution is then dispersed over the targeted soil. The biodegradable bags 10, now containing the calcium and carbon, are subsequently removed and placed on or plowed into the same or similar targeted soil sites. In this manner, none of the original calcium cyanamide or containers is wasted and separate disposal is not required because all of it is soil/plant beneficial.

The liquid exiting line 20 can be sent directly into an irrigation system 24 or to a liquid fertilizer sprayer or injector diagrammatically represented by the numeral 25. In the field, this method is known as the tea bag method.

A "coffee" method also can be used. Filter-quality cup-shaped bags 28 having looped strings or handles are supported by a screened supporting basket 30. The calcium cyanamide granules and fines are deposited in these biodegradable bags 28 as one deposits coffee in a filter bag in the common home coffee maker.

In FIG. 6, the tank 12 is equipped with a strainer basket 26 fine enough to support a filter liner 28 to retain the fines and granules. This filter liner material has approximately the same characteristics as the bags 10. When the strainer basket/filter combination is used, the calcium cyanamide can be deposited right into the filter liner from one of the bags 10 or directly from another container. As in FIG. 5, there will be means to circulate water within the tank so that the liquid will absorb the solubles. It should also be noted that in FIGS. 5 and 6, a second tank 50 is available to contain other liquid fertilizers. Proper amounts of these fertilizers can be measured into tank 10 for a proper pH factor and for the required plant food treatment tailored for the soil, plant and water conditions which are to be treated by the combination.

In the methods described above, it can be seen that the insolubles are retained in biodegradable bags. The liquid component can be dispensed by conventional equipment.

In FIG. 7, there is shown a tank 31 which has agitation blades 32 and 34 disposed therein and a conduit 36 leading from one end of the tank to the other. Conduit 36 is equipped with a heavy duty pump 37 and valve 38. If desired, the conduit 36 can be split into three branches at the entry end of the tank, namely at 40, 42, and 44. This will help distribute the circulating liquid, or slurry, throughout the tank. In this instance, the insolubles, such as calcium and carbon, cause the liquid to become slurry-like. It is important, therefore, that considerable agitation, with or without suspension agents, is available so that the carbon and calcium remain in suspension until the product is exhausted through the conduit 46. The conduit 46 leads either to an irrigation water injection system or to a recently developed spreader equipped to distribute a solids suspension-like product (e.g., gypsum). Apparatuses and processes for handling insolubles in liquid suspension are known to the prior art.

When the commercial cyanamide fertilizer is mixed with sufficient water (14×+) in tank 12, complete hydrolysis occurs and the component cyanamide N becomes immediately bio-effective and remains so, subject to tank content temperatures staying below 70° F. With line and irrigation water temperatures usually being 50° F. to 60° F., cyanamide N stability to the site as a plant food and pesticide can be expected. The cyanamide N being nitrification bacteria debilitating causes the urea metabolites to be long lasting and not leaching for weeks thereafter. After the liquid has been sprayed on the targeted soil site, the calcium and carbon-containing bags are distributed over the same or similar targeted soil. The bags and the calcium and carbon will disintegrate and beneficially become part of the soil.

Another tank 50 is disclosed for containing a liquid fertilizer having either a low or a high pH factor. Such fertilizer can be used to tailor the ultimate liquid in tank 12 for the site soil that is to be encountered.

In practice, the practitioner will predetermine the acidity or alkalinity of the soil and water to be treated. The solution in tank 12 may be pre- or post-hydrolysis tested and then supplemental fertilizer from tank 50 may be added, if necessary, to obtain the proper pH for the water and/or soil to be treated.

It is important to observe that the calcium cyanamide fertilizer is mixed with water prior to application so that hydrolysis occurs and the available cyanamide N is preformed. The processes permit the cyanamide N in water to be stabilized and held or to be quickly applied to the targeted soil before its deterioration. Irrigation injection liquid application causes an even distribution and good soil penetration. For topical liquid application, immediate ground plowing is recommended for improved penetration.

The invention has been described with respect to certain preferred embodiments but is subject to variation within the scope of the appended claims. Reference should be made to the following claims rather than the foregoing specification as indicating the true scope of the invention in which exclusive rights are claimed.

I claim:

1. A process for preparing and applying a fertilizing and bioactive composition formed using calcium cyanamide, comprising:

providing porous containers containing calcium cyanamide;

suspending the containers in water to form a mixture until water-insoluble materials are separated therefrom;

dissolving any remaining portion in the water to form a solution;

treating the solution to attain a pH to maintain a bioactive cyanamide anion;

removing the containers from the solution after hydrolysis occurs; and dispersing the solution over an area to be treated.

2. The process of claim 1 wherein the calcium cyanamide includes insoluble fines and granules.

3. The process of claim 1 wherein the water in the mixture exceeds the calcium cyanamide by at least 14 parts water to one part calcium cyanamide.

4. The process of claim 1 wherein the solution is evenly dispersed over the area to be treated.

5. The process of claim 1 and further including applying the water-insoluble materials to the area to be treated.

6. The process of claim 1 further comprising adding additional fertilizers to the calcium cyanamide or the mixture.

7. The process of claim 1 including adding a caustic to the mixture prior to its application to the area to be treated.

8. A process for preparing and applying calcium cyanamide fertilizer comprising:

provm an aqueous solution formed from calcium cyanamide;

separating insoluble solids from the solution;

treating the solution to sustain a pH value that maintains a bioactive cyanamide anion; and dispersing the solution over an area to be treated.

9. The process of claim 8 wherein separating the insoluble solids comprises filtering the solution.

10. The process of claim 8 wherein separating the insoluble solids from the solution comprises centrifuging the solution.

11. The process according to claim 9, further comprising:

providing porous containers containing the calcium cyanamide;

providing a vessel for receiving the solution;

suspending the containers in the solution until the solids are separated therefrom;

dissolving any remaining portion in said liquid;

treating the solution to sustain a pH value of above 10;

removing the insoluble solids from the solution after hydrolysis occurs; and dispersing the solution over an area to be treated.

12. The process of claim 8 wherein the insoluble solids are fines and granules.

13. The process of claim 12 wherein water in the vessel exceeds the calcium cyanamide added to the vessel by at least a 14 to 1 ratio.

14. The process of claim 13 wherein the contents of the vessel is evenly dispersed over the area to be treated.

15. The process of claim 8 and further including adding additional fertilizers to the calcium cyanamide or the suspension.

16. The process of claim 8 wherein additives are added to the suspension.

17. The process according to claim 15 wherein the additional fertilizers are selected from the group consisting of nitrogen-containing fertilizers urea, ammonia, calcium-containing fertilizers fertilizer, and mixtures thereof.

18. The method of claim 8 wherein treating the solution comprises adding a caustic.

19. The process of claim 11 and further including applying the water-insoluble materials to the area to be treated.

20. A process for preparing and applying calcium cyanamide fertilizer, comprising:

forming a mixture comprising a liquid and calcium cyanamide, the mixture having in excess of 14 parts of liquid to 1 part of calcium cyanamide;

adding fertilizer additives to the mixture to sustain a pH of the mixture that maintains a bioactive cyanamide anion;

agitating the mixture to provide a uniform dispersion therein; and dispersing the mixture on an area to be treated.

21. The process of claim 20 wherein the mixture is directly applied to the area to incorporate the mixture into soil of the area.

22. The process of claim 21 wherein:

the mixture is integrated into an irrigation stream leading to the area to be treated; and using the irrigation stream to incorporate a soluble hydrolysis product of bioactive cyanamide anion into the area to be treated.

23. The process of claim 22 further comprising establishing a buffering system in the solution of calcium cyanamide when the soil at the area to be treated has a pH value of more than 7.

24. An aqueous buffered system comprising hydrolysis products of calcium cyanamide, the aqueous system having a pH that maintains bioactive cyanamide anion.

* * * * *